US007935016B2

(12) United States Patent
Kawaguchi et al.

(10) Patent No.: US 7,935,016 B2
(45) Date of Patent: May 3, 2011

(54) AUTOMATIC TRANSMISSION

(75) Inventors: Takateru Kawaguchi, Shizuoka (JP);
Shinya Mochiyama, Shizuoka (JP);
Fumitaka Nagashima, Shizuoka (JP);
Yoshihide Shinso, Shizuoka (JP)

(73) Assignee: Jatco Ltd, Fuji-shi (JP)

( * ) Notice: Subject to any disclaimer, the term of this patent is extended or adjusted under 35 U.S.C. 154(b) by 796 days.

(21) Appl. No.: 11/955,794

(22) Filed: Dec. 13, 2007

(65) Prior Publication Data

US 2008/0167155 A1  Jul. 10, 2008

(30) Foreign Application Priority Data

Jan. 9, 2007 (JP) ................................. 2007-001500

(51) Int. Cl.
*F16H 31/00* (2006.01)
*F16D 43/28* (2006.01)
(52) U.S. Cl. .................. 475/118; 192/85.32; 192/85.63
(58) Field of Classification Search .................. 475/118, 475/119, 125; 477/146, 147, 149, 160, 163, 477/907; 192/85.01, 52.4, 85.32
See application file for complete search history.

(56) References Cited

U.S. PATENT DOCUMENTS

| | | | |
|---|---|---|---|
| 4,785,689 A | 11/1988 | Iwatsuki et al. | |
| 4,843,551 A | 6/1989 | Milunas | |
| 5,016,174 A | 5/1991 | Ito et al. | |
| 5,033,328 A | 7/1991 | Shimanaka | |
| 5,060,540 A | 10/1991 | Yamaguchi | |
| 5,113,725 A | 5/1992 | Tomomatsu et al. | |
| 5,233,890 A | 8/1993 | Aldrich, III et al. | |
| 5,439,427 A | 8/1995 | Enokido et al. | |
| 5,613,583 A | 3/1997 | Kono et al. | |
| 5,846,162 A | 12/1998 | Ito et al. | |
| 5,855,532 A | 1/1999 | Sugiyama | |
| 5,957,800 A | 9/1999 | Oba et al. | |
| 6,270,439 B1 | 8/2001 | Suzuki | |
| 6,309,324 B1 | 10/2001 | Sawa et al. | |
| 6,319,164 B1 | 11/2001 | Runde et al. | |
| 6,357,289 B1 | 3/2002 | Futawatari | |
| 6,440,040 B1 | 8/2002 | Amano et al. | |

(Continued)

FOREIGN PATENT DOCUMENTS

DE  100 38 144 A1  4/2001

(Continued)

OTHER PUBLICATIONS

T. Kawaguchi, U.S. PTO Office Action, U.S. Appl. No. 11/962,469, dated Jul. 6, 2010, 14 pages.

(Continued)

*Primary Examiner* — Edwin A. Young
(74) *Attorney, Agent, or Firm* — Foley & Lardner LLP

(57) ABSTRACT

An automatic transmission includes a planetary gear mechanism, an engagement element group including a particular engagement element having first and second pressure chambers, a pressure control valve to regulate the fluid pressure for the particular engagement element, and a selector valve arranged to connect the second pressure chamber with the pressure control valve at a first valve position, and to disconnect the second pressure chamber from the pressure control valve at a second valve position. A shift control section is configured to command a shift operation from a first gear position, to a second gear position, by controlling the selector valve to the second valve position and to supply the fluid pressure to the first pressure chamber, and to judge the selector valve to be in an abnormal state, in accordance with a parameter in the shift operation.

19 Claims, 9 Drawing Sheets

U.S. PATENT DOCUMENTS

| | | | |
|---|---|---|---|
| 6,520,881 | B1 | 2/2003 | Long et al. |
| 7,140,993 | B2 | 11/2006 | Long et al. |
| 7,402,123 | B2 | 7/2008 | Kobayashi et al. |
| 7,410,438 | B2 * | 8/2008 | Moehlmann et al. ......... 475/116 |
| 7,419,452 | B2 | 9/2008 | Nozaki et al. |
| 7,682,275 | B2 | 3/2010 | Yoneyama |
| 2006/0040791 | A1 | 2/2006 | Nakajima et al. |
| 2007/0015624 | A1 | 1/2007 | Ota et al. |
| 2008/0064568 | A1 | 3/2008 | Kawaguchi et al. |
| 2008/0113848 | A1 | 5/2008 | Inoue et al. |
| 2008/0153655 | A1 | 6/2008 | Kawaguchi et al. |
| 2008/0176706 | A1 | 7/2008 | Wu et al. |
| 2008/0221764 | A1 | 9/2008 | Nagashima et al. |

FOREIGN PATENT DOCUMENTS

| | | | |
|---|---|---|---|
| JP | 1-172660 | A | 7/1989 |
| JP | 2-304262 | A | 12/1990 |
| JP | 3-113161 | A | 5/1991 |
| JP | 04-015359 | A | 1/1992 |
| JP | 5-288264 | A | 2/1993 |
| JP | 5-346160 | A | 12/1993 |
| JP | 6-109129 | A | 4/1994 |
| JP | 8-219274 | A | 8/1996 |
| JP | 09-089098 | A | 3/1997 |
| JP | 09-317871 | A | 12/1997 |
| JP | 11-280896 | A | 10/1999 |
| JP | 11-280898 | A | 10/1999 |
| JP | 2000-240785 | A | 9/2000 |
| JP | 2003-097691 | A | 4/2003 |
| JP | 2004-068989 | A | 3/2004 |

OTHER PUBLICATIONS

English translation of JP 06-109129 previously submitted in an IDS dated Apr. 14, 2009, 14 pages.

U.S. Appl. No. 11/962,469, filed Dec. 21, 2007, Kawaguchi et al.

U.S. Appl. No. 12/029,632, filed Feb. 12, 2008, Kawaguchi et al.

T. Kawaguchi, U.S. PTO Notice of Allowance, U.S. Appl. No. 11/946,483, dated Aug. 26, 2010, 21 pages.

T. Kawaguchi, U.S. PTO Office Action, U.S. Appl. No. 12/029,632, dated Sep. 1, 2010, 13 pages.

U.S. Appl. No. 11/931,817, filed Oct. 31, 2007, Park et al.

U.S. Appl. No. 11/946,483, filed Nov. 28, 2007, Kawaguchi et al.

T. Kawaguchi, U.S. PTO Notice of Allowance, U.S. Appl. No. 11/853,181, dated Sep. 23, 2010, 10 pages.

T. Kawaguchi, U.S. PTO Notice of Allowance, U.S. Appl. No. 12/029,632, dated Nov. 4, 2010, 5 pages.

T. Kawaguchi, U.S. PTO Final Office Action, U.S. Appl. No. 11/962,469, dated Dec. 7, 2010, 8 pages.

* cited by examiner

FIG.1
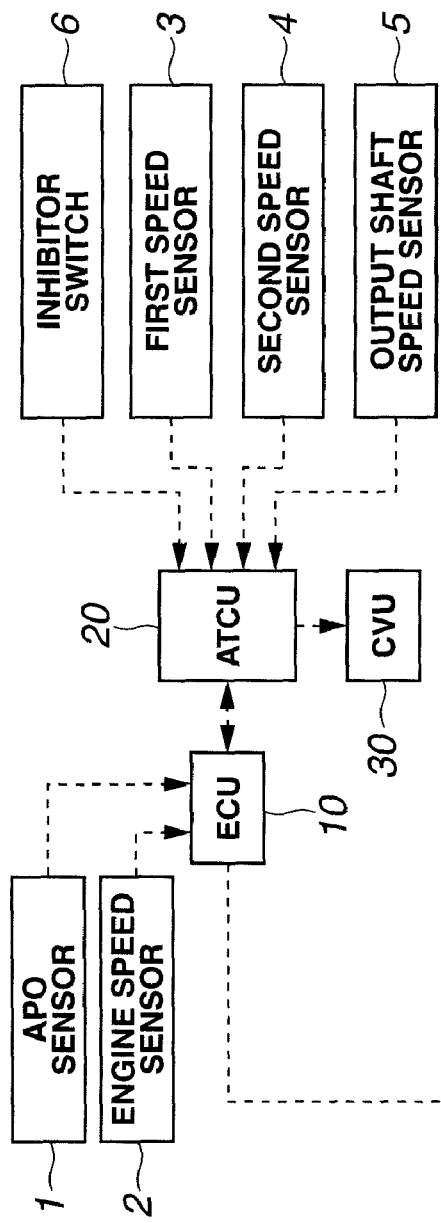
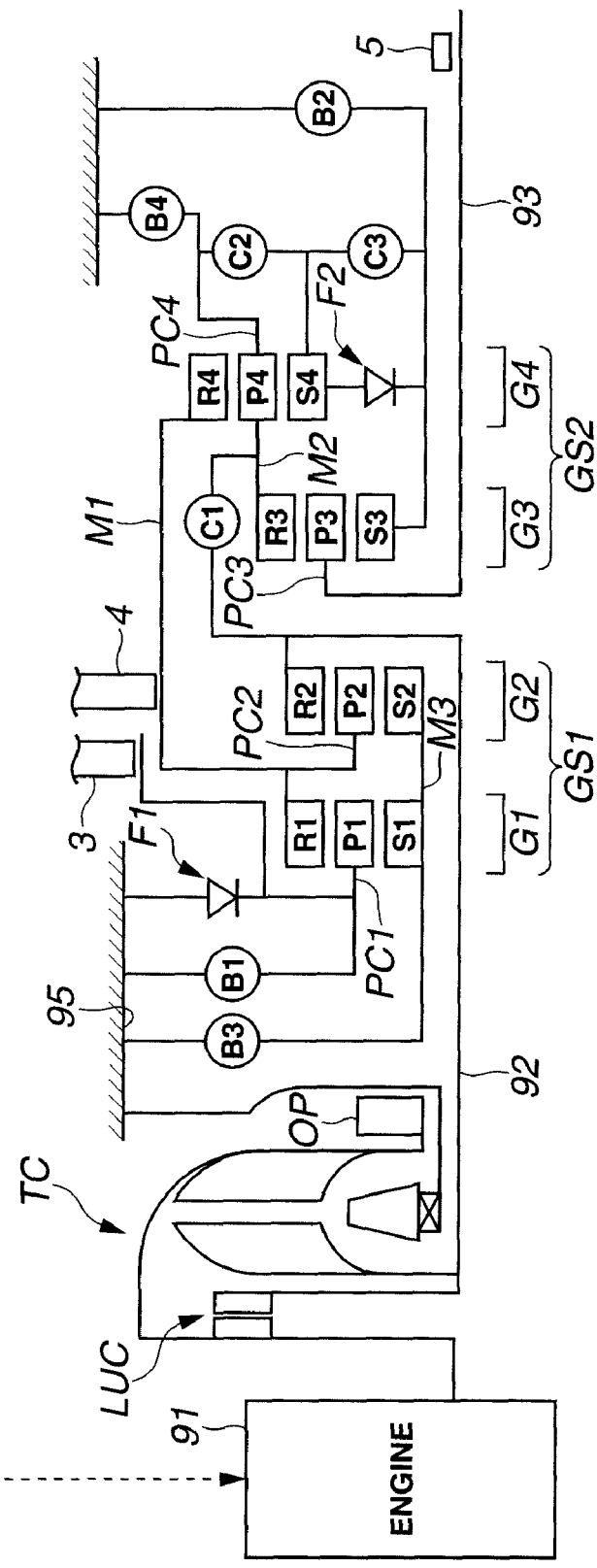

FIG.2

| | B1 Fr/B | C1 I/C | C2 D/C | C3 H&LR/C | B2 LOW/B | B3 2346/B | B4 R/B | F1 | F2 |
|---|---|---|---|---|---|---|---|---|---|
| 1st | (○) | | | (○) | ○ | | | ○ | ○ |
| 2nd | | | | (○) | ○ | ○ | | | ○ |
| 3rd | | | ○ | | ○ | ○ | | | |
| 4th | | | ○ | ○ | | ○ | | | |
| 5th | | ○ | ○ | ○ | | | | | |
| 6th | | ○ | | ○ | | ○ | | | |
| 7th | ○ | ○ | | ○ | | | | ○ | |
| Rev. | ○ | | | ○ | | | ○ | | |

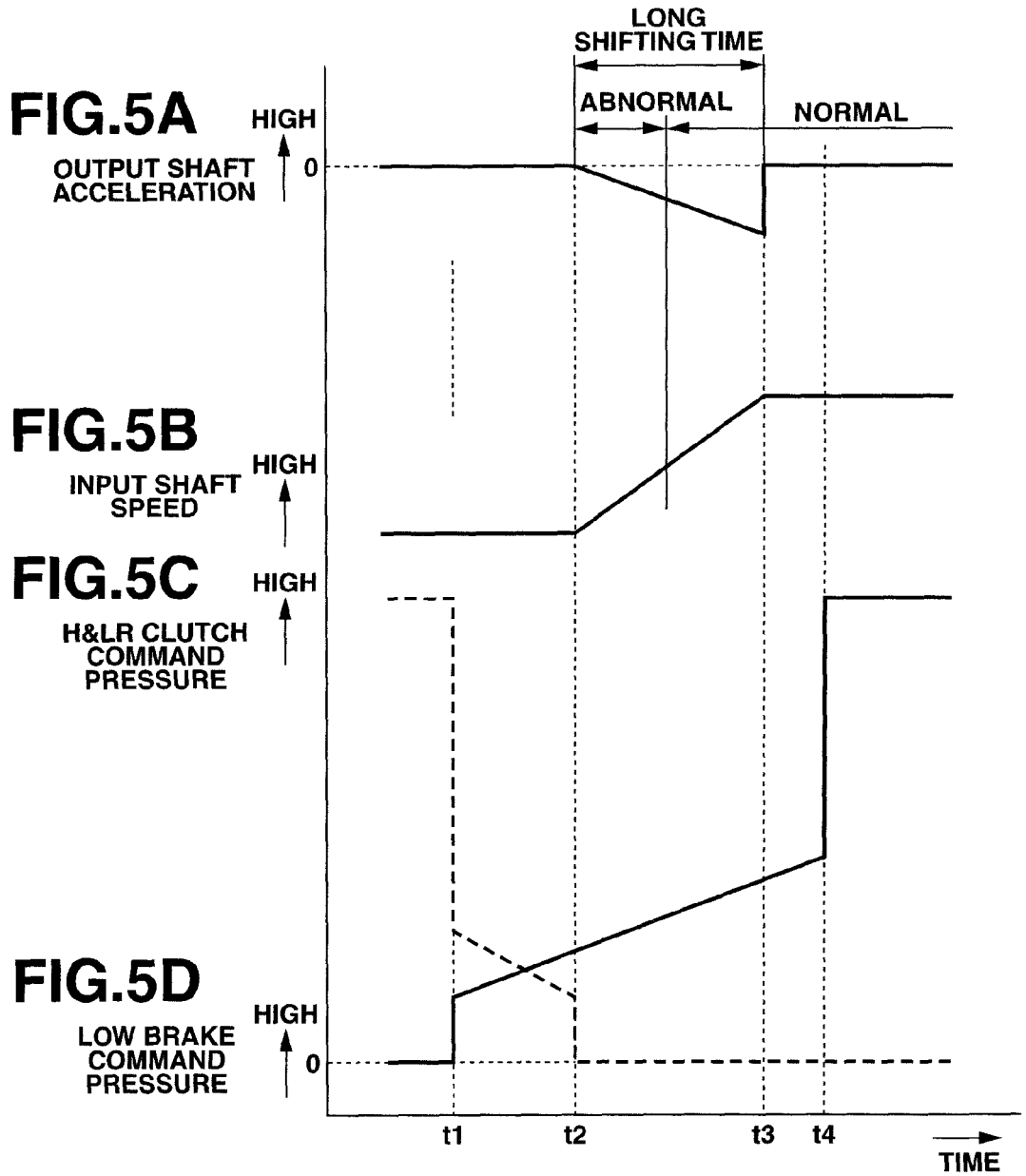

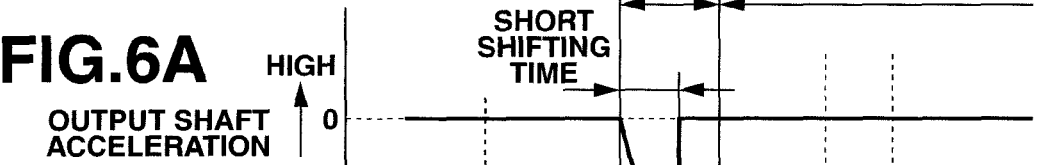
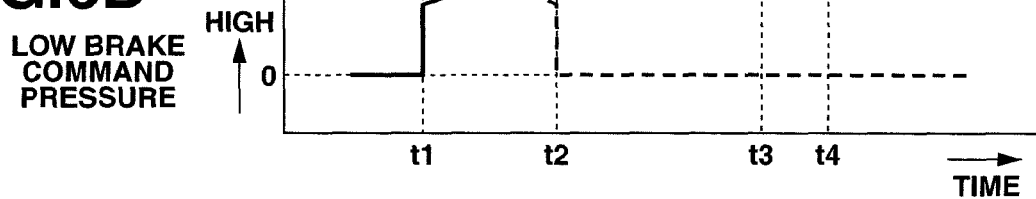

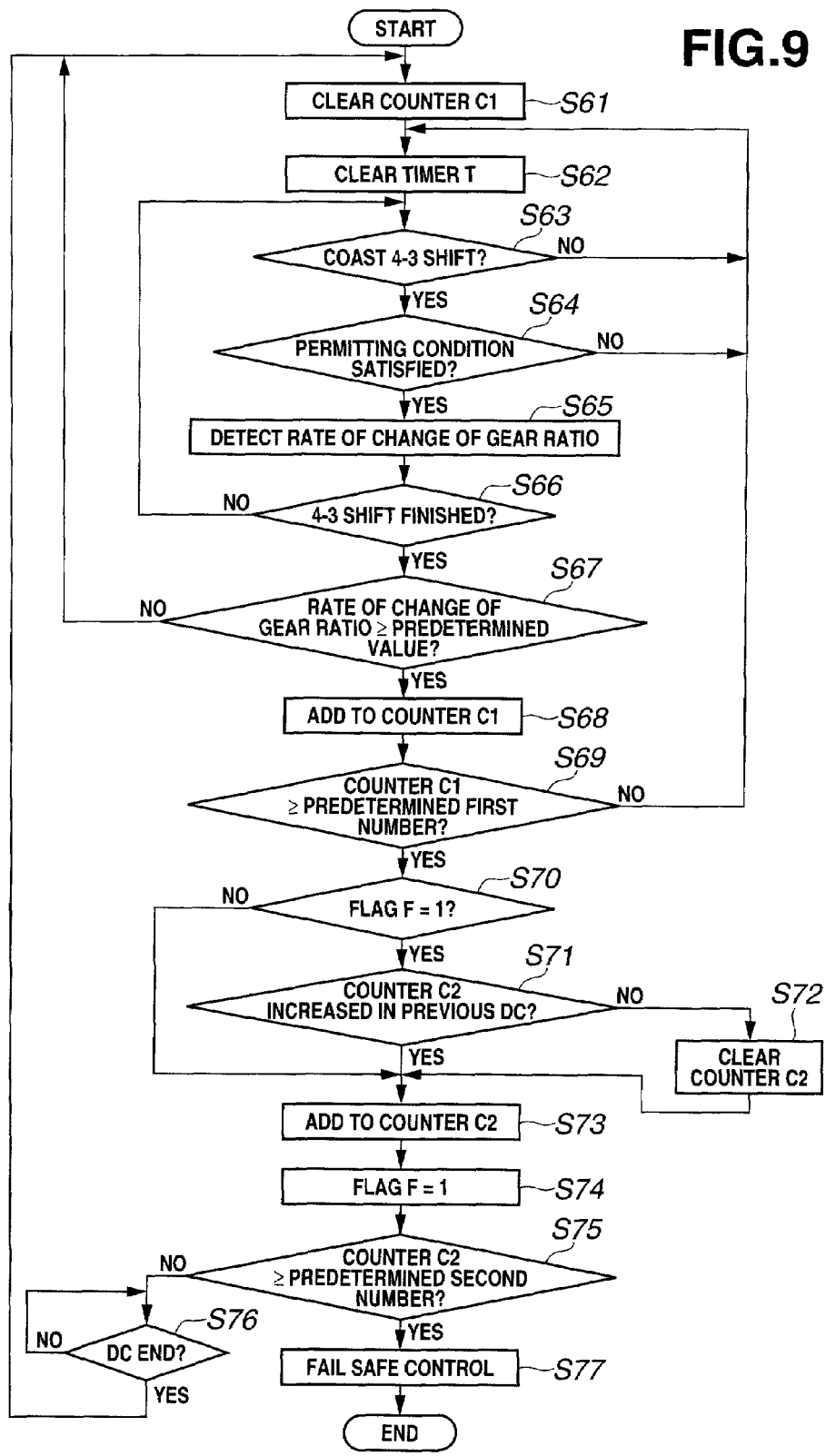

AUTOMATIC TRANSMISSION

BACKGROUND OF THE INVENTION

The present invention relates to technique of detecting a failure of an engaging element in a step automatic transmission, and technique of a fail-safe control in case of such a failure.

A step automatic transmission includes a planetary gear mechanism and a plurality of friction engaging elements or devices to select a desired gearing or gear position to provide a desired speed or gear ratio by changing over between an engaged state and a disengaged or released state. Among various friction engaging elements, there is such a friction engaging element that a required engagement capacity varies widely in dependence on the gearing position. If a hydraulic circuit is to change a hydraulic fluid pressure supplied to such a friction engaging element, to meet required engagement capacities differing largely in dependence on the gear speed, then the hydraulic pressure control becomes very complicated.

Therefore, a Japanese patent document JP 05-288264A discloses technique of preventing deterioration of a shift shock by employing a friction engaging element formed with two pressure chambers having different pressure receiving surfaces, and a hydraulic circuit to supply an oil pressure to one or both of the pressure chambers in accordance with the required engagement capacity.

SUMMARY OF THE INVENTION

For such a friction engaging element, it is possible to employ a hydraulic system including a pressure control valve for controlling the supply of a hydraulic pressure to the friction engaging element by regulating a line pressure, and a selector valve for selectively supplying the outlet pressure of the pressure control valve to the larger pressure chamber having the larger pressure receiving area.

However, the supply of the fluid pressure to the larger pressure chamber continues invariably in case of double failure in which the selector valve is stuck by a foreign object such a burr at the valve position to supply the fluid pressure to the larger pressure chamber, and thereafter the pressure control valve is stuck at the valve position to supply the fluid pressure.

By such a double failure, the friction engaging element is held engaged. Therefore, if a further shift is commanded in accordance with a vehicle operating condition, and another friction engagement element is engaged, the simultaneous engagement of the two engaging elements could cause interlock resulting in hard deceleration of the vehicle.

It is therefore an object of the present invention to provide technique of detecting abnormality in a selector valve accurately. It is another object of the present invention to provide technique of detecting abnormality in a selector valve accurately and to performs a fail-safe control to prevent interlock.

According to one aspect of the present invention, an automatic transmission comprises: a planetary gear mechanism, an engagement element group, a pressure control valve, a selector valve and a shift control section. The engagement element group includes a plurality of friction engagement elements to achieve a plurality of gear positions in the planetary gear mechanism. At least one of the friction engagement elements is a particular engagement element (or variable engagement element, or multi-chamber engagement element) including first and second hydraulic pressure chambers to which a hydraulic fluid pressure is to be supplied to actuate the friction engagement element. The pressure control valve is a valve to regulate the hydraulic fluid pressure to be supplied to the particular engagement element. The selector valve is arranged to connect the second pressure chamber of the particular engagement element with the pressure control valve when the selector valve is at a first valve position, and to disconnect the second pressure chamber from the pressure control valve when the selector valve is at a second valve position. The shift control section is configured to command a shift operation from a first gear position in which the particular engagement element is disengaged, to a second gear position in which the particular engagement element is engaged, by controlling the selector valve to the second valve position to disconnect the second pressure chamber from the pressure control valve and to supply the hydraulic fluid pressure from the pressure control valve to the first pressure chamber of the particular engagement element, and to judge the selector valve to be in an abnormal state in which the selector valve is unable to disconnect the second pressure chamber from the pressure control valve, in accordance with a parameter in the shift operation from the first gear position to the second gear position.

According to another aspect of the invention, an automatic transmission comprises: a planetary gear mechanism; an engagement element group including a plurality of friction engagement elements to achieve a plurality of gear ratios in the planetary gear mechanism, at least one of the friction engagement elements being a first (or variable) engagement element including a first hydraulic pressure chamber and a second hydraulic pressure chamber; a hydraulic circuit including a pressure control valve to produce a hydraulic fluid pressure to be supplied to at least one of the first and second pressure chambers of the particular engagement element, and a selector valve including a first valve position to connect the second pressure chamber of the particular engagement element with the pressure control valve, and a second valve position to disconnect the second pressure chamber from the pressure control valve; and a shift control section configured to command a shift operation from a first gear ratio to a second gear ratio by producing a command signal to control the selector valve to the second valve position to disconnect the second pressure chamber from the pressure control valve and to supply the hydraulic fluid pressure from the pressure control valve to the first pressure chamber to engage the particular engagement element, and to determine whether the selector valve is in an abnormal state or not, by monitoring a parameter representing speed of engagement of the particular engagement element in the shift operation from the first gear ratio to the second gear ratio.

According to still another aspect of the present invention, for an automatic transmission including at least a planetary gear mechanism; an engagement element group including at least one first (or variable) engagement element including a first pressure chamber and a second pressure chamber; a pressure control valve to produce a hydraulic fluid pressure to be supplied to the variable engagement element; and a selector valve having a first valve position to connect the second pressure chamber with the pressure control valve and a second valve position to disconnect the second pressure chamber from the pressure control valve: abnormality detecting technique (apparatus and/or process) or controlling technique includes at least a shifting element for commanding a shift operation from a first gear ratio, to a second gear ratio, by producing a command signal to control the selector valve to the second valve position to disconnect the second pressure chamber from the pressure control valve and to engage the particular engagement element by supplying the hydraulic fluid pressure from the pressure control valve to the first pressure chamber of the particular engagement element; a monitoring element for monitoring behavior of engagement of the particular engagement element responsive to the command signal, and a judging element for determining whether the selector valve is in an abnormal state or not, in accordance with the behavior of the engagement of the particular engagement element.

BRIEF DESCRIPTION OF THE DRAWINGS

FIG. 1 is a skeleton diagram showing an automatic transmission according to first, second, third and fourth embodiments of the present invention.

FIG. 2 is an engagement table showing engagement conditions of friction engagement elements in the automatic transmission of FIG. 1.

FIG. 5 (FIGS. 5A~5D) is a time chart illustrating behavior in a 4-3 shift of the automatic transmission of FIG. 1 in a normal state.

FIG. 6 (FIGS. 6A~6D) is a time chart illustrating behavior in the 4-3 shift of the automatic transmission of FIG. 1 in an abnormal state.

FIG. 9 is a flowchart showing a control process according to the fourth embodiment, performed by ATCU.

DETAILED DESCRIPTION OF THE INVENTION

Figure 3:
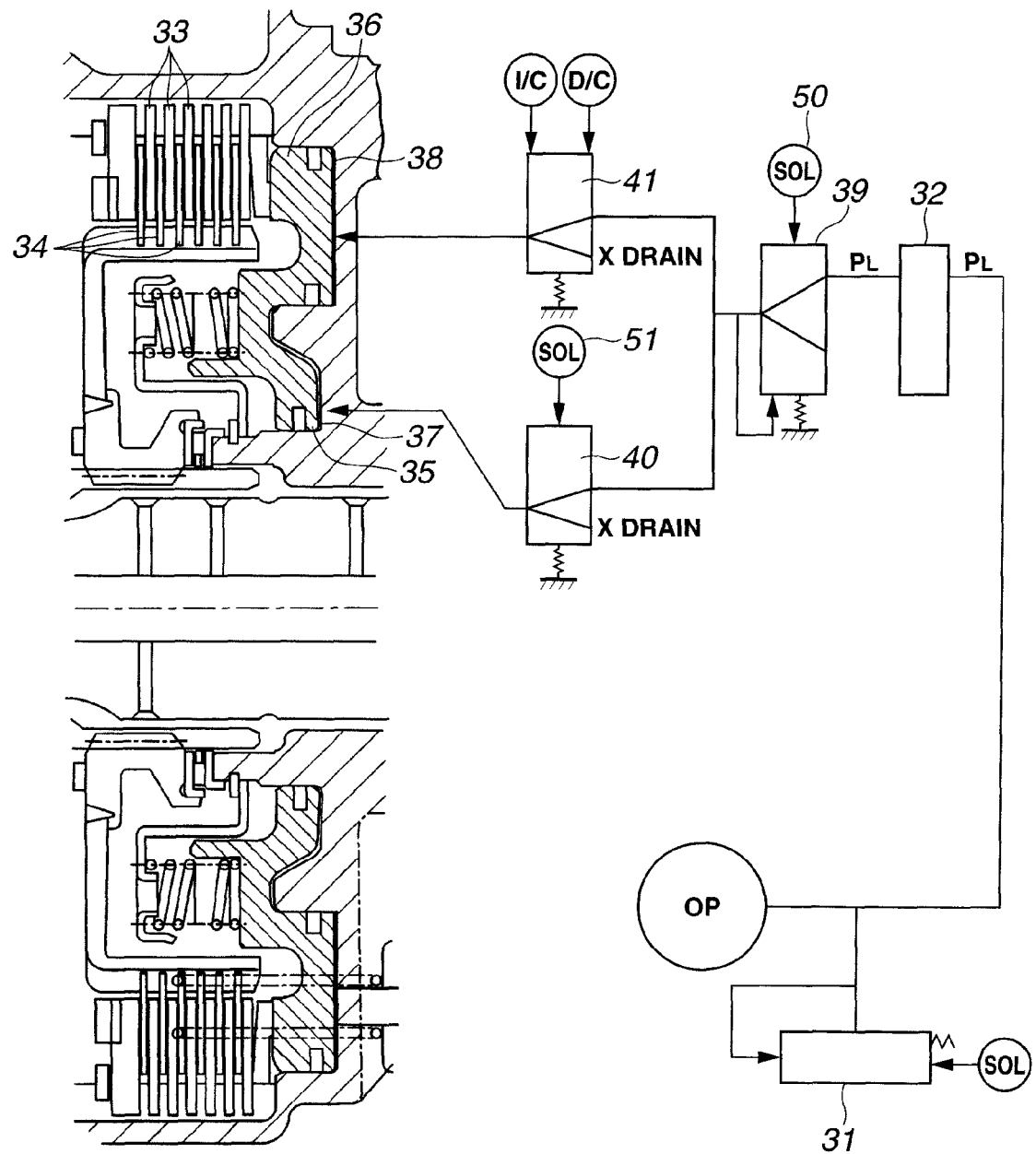
FIG. 3 is a schematic view showing a low brake B2 of the automatic transmission of FIG. 1 in the form of a sectional view, and a hydraulic circuit section for the low brake B2 in the form of a circuit diagram.

FIG. 1 shows, in a skeleton diagram, an automatic transmission according to a first embodiment of the present invention. The automatic transmission shown in FIG. 1 is a step automatic transmission having seven forward speeds and one reverse speed. The automatic transmission includes a shift gear mechanism including a planetary gear mechanism and an engagement device group. In the example shown in FIG. 1, the planetary gear mechanism includes four planetary gear sets G1~G4, and the engagement element group includes seven friction engagement elements C1~C3 and B1~B4. A driving force of an engine 91 is inputted, through a torque converter TC, to an input shaft 92 of the automatic transmission. Rotation is transmitted from input shaft 92 through the planetary gear mechanism to an output shaft 93 to drive a vehicle. A gear ratio is determined by the planetary gear mechanism and the engagement element group. An oil pump OP is provided coaxially with a pump impeller of torque converter TC, and arranged to pressurize an operating oil by being driven by the driving force of engine 91.

There are further provided an engine controller (ECU) 10 to control engine 91, an automatic transmission controller (ATCU) 20 to control the automatic transmission, and a control valve unit (CVU) 30 (serving as shift controlling means) to control fluid (oil) pressures for the friction engagement elements under the control of automatic transmission controller 20. Engine controller 10 and transmission controller 20 are connected by communicating means such as a CAN communication line, and arranged to share information such as sensor information and control information.

ECU 10 is connected with an accelerator position sensor (APO sensor) 1 for sensing a driver's accelerator input by sensing an accelerator pedal operation quantity, and an engine speed sensor 2 for sensing an engine speed (rpm) of engine 91. In accordance with the sensed accelerator pedal operation quantity and sensed engine speed, ECU 10 controls the engine output speed and engine torque by controlling the fuel injection quantity and throttle opening.

ATCU 20 is connected with a first (turbine) speed sensor 3 for sensing the rotational speed of a first planet carrier PC1, a second (turbine) speed sensor 4 for sensing the rotational speed of a first ring gear R1, an output shaft speed sensor 5 for sensing the rotational speed of the output shaft 93, and an inhibitor switch 6 for sensing a driver's shift lever operating condition. In a D range, ATCU 20 selects an optimum command speed (or gear ratio) in accordance with a vehicle speed Vsp and the accelerator pedal operation quantity APO, and sends a control command to achieve the command speed, to CVU 30.

The planetary gear mechanism is connected between the input and output shafts 92 and 93. The planetary gear mechanism of this example includes a first planetary gear system GS1 (G1, G2) and a second planetary gear system GS2 (G3, G4). First planetary gear system GS1 is disposed axially between the torque converter TC and the second planetary gear system GS2. The engagement element group includes a plurality of clutches C1, C2 and C3, and a plurality of brakes B1, B2, B3 and B4. Furthermore, there are provided a plurality of one way clutches F1 and F2.

First planetary gear set G1 is a single pinion planetary gear set including first sun gear S1, first ring gear R1 and first planet carrier PC1 carrying first pinions P1 each engaging with both the first sun gear S1 and first ring gear R1. Second planetary gear set G2 is a single pinion planetary gear set including second sun gear S2, second ring gear R2 and second planet carrier PC2 carrying second pinions P2 engaging with both the second sun gear S2 and second ring gear R2. Third planetary gear set G3 is a single pinion planetary gear set including third sun gear S3, third ring gear R3 and third planet carrier PC3 carrying third pinions P3 engaging with both the third sun gear S3 and third ring gear R3. Fourth planetary gear set G4 is a single pinion planetary gear set including fourth sun gear S4, fourth ring gear R4 and fourth planet carrier PC4 carrying fourth pinions P4 engaging with both the fourth sun gear S4 and fourth ring gear R4.

Input shaft 92 is connected to second ring gear R2. The rotational driving force of engine 91 transmitted through torque converter TC is inputted to second ring gear R2. Output shaft 93 is connected with third planet carrier PC3. The output rotational driving force is transmitted from output shaft 93, through a final gear unit to drive wheels of the vehicle.

A first connecting member M1 connects first ring gear R1, second planet carrier PC2 and fourth ring gear R4 so that they rotate as a unit. A second connecting member M2 connects third ring gear R3 and fourth planet carrier PC4 so that they rotate as a unit. A third connecting member M3 connects first sun gear S1 and second sun gear S2 so that they rotate as a unit.

The above-mentioned first planetary gear system GS1 is formed by connecting first and second planetary gear sets G1 and G2 with first and third connecting members M1 and M3. Thus, first planetary gear system GS1 is composed of four rotating members. Second planetary gear system GS2 is formed by connecting third and fourth planetary gear sets G3 and G4 with second connecting member M2. Therefore, second planetary gear system GS2 is composed of five rotating members.

In the first planetary gear system GS1, torque is inputted from input shaft 92 to second ring gear R2, and the torque is transmitted through first connecting member M1 to the second planetary gear system GS2. In the second planetary gear system GS2, torque can be inputted from input shaft 92 directly to second connecting member M2, and, moreover, torque is transmitted through first connecting member M1 to fourth ring gear R4. Then, the torque is transmitted from third planet carrier PC3 to output shaft 93.

First clutch C1 is an input clutch for selectively making and breaking connection between input shaft 92 and second connecting member M2. Second clutch C2 is a direct clutch for selectively making and breaking connection between fourth sun gear S4 and fourth planet carrier PC4.

Third clutch C3 is an H&LR clutch for selectively making and breaking connection between third sun gear S3 and fourth sun gear S4. Second one way clutch F2 is disposed between third sun gear S3 and fourth sun gear S4. When H&LR clutch C3 is disengaged, and the rotational speed of fourth sun gear S4 is higher than that of third sun gear S3, then the third and fourth sun gears S3 and S4 rotate at different speeds independently. Therefore, third and fourth planetary gear sets G3 and G4 connected by second connecting member M2 can achieve independent gear ratios, respectively.

First brake B1 is a front brake disposed between a transmission case 95 and the first planet carrier PC1, for selectively holding the first planet carrier PC1. First one way clutch F1 is connected in parallel with this front brake B1. Second brake B2 is a low brake for selectively holding the third sun gear S3. Third brake B3 is a 2346 brake for selectively holding the third connecting member M3 connecting first sun gear S1 and second sun gear S2. Fourth brake B4 is a reverse brake for selectively holding the fourth planet carrier PC4.

The thus-constructed shift gear mechanism can achieve a desired speed by changing the engagement states of these friction engagement elements or devices as shown in an engagement table of FIG. 2. In FIG. 2, each of small circles denotes engagement of a corresponding friction engagement element. Each of small circles in parentheses indicates that a corresponding friction engagement element is engaged at a range position at which engine braking is applied.

As shown in FIG. 2, first speed is achieved by engaging only low brake B2. In this state, first and second one-way clutches F1 and F2 are engaged. At second speed, low brake B2 and 2346 brake B3 are engaged, and second one-way clutch F2 is engaged. At third speed, low brake B2, 2346 brake B3 and direct clutch C2 are engaged, and neither of first and second one-way clutches F1 and F2 is engaged. At fourth speed, 2346 brake B3, direct clutch C2 and H&LR clutch C3 are engaged. At fifth speed, input clutch C1, direct clutch C2 and H&LR clutch C3 are engaged. At sixth speed, 2346 brake B3, input clutch C1 and H&LR clutch C3 are engaged. At seventh speed, front brake B1, input clutch C1 and H&LR clutch C3 are engaged, and first one-way clutch F1 is engaged. At reverse, reverse brake B4, front brake B1 and H&LR clutch C3 are engaged.

FIG. 3 shows a hydraulic circuit section for low brake B2 which is to be engaged only at first, second and third speeds, and which can serve as a particular engagement element (or variable engagement element or multi-chamber engagement element) having at least two hydraulic pressure chambers. The circuit section shown in FIG. 3 is a part of the hydraulic circuit of CVU 30.

CVU 30 includes a pressure regulator valve 31 and a manual valve 32. Pressure regulator valve 31 produces a line pressure by regulating a pressure discharged from oil pump OP in accordance with an opening of pressure regulator valve 31. Manual valve 32 selects a supply passage to supply the line pressure from pressure regulator valve 31, to a selected one or more of the engaging elements.

Low brake B2 (corresponding to a particular engagement element or multi or dual-chamber engagement element having at least two hydraulic pressure chambers) includes an alternating friction plate pack of first friction plates 33 and second friction plates 44, and a piston for compressing the friction plate pack to engage the brake. The piston of low brake B2 includes a first piston portion 35 and a second piston portion 36. The first piston portion 35 has a first pressure receiving area, and the second piston portion 36 has a second pressure receiving area which is greater than the first pressure receiving area of first piston portion 35. The first and second piston portions 35 and 36 are integral parts of the piston. A first pressure chamber 37 is arranged to apply a first hydraulic fluid pressure to the first piston portion 35 to force the piston toward the clutch plate pack. A second pressure chamber 38 is arranged to apply a second hydraulic fluid pressure to the second piston portion 36 to force the piston toward the clutch plate pack. The hydraulic circuit section is arranged to supply fluid pressures to the first and second pressure chamber 37 and 38 independently. The piston pushes the friction plate pack (33, 34) with a pressure force which is equal to a sum of a first product of the first pressure in the first pressure chamber 37 and the first pressure receiving area of first piston portion 35 and a second product of the second pressure in the second pressure chamber 38 and the second pressure receiving area of the second piston portion 36, and thereby produces the engagement capacity of low brake B2. In this example, the second pressure chamber 38 is an outer chamber surrounding the first pressure chamber 37, as shown in FIG. 3, and the second piston portion 36 is an outer portion surrounding the first piston portion 35 which is an inner portion closer to the axis of low brake B2.

The hydraulic circuit section for low brake B2 includes a pressure control valve 39 for regulating a hydraulic fluid pressure to be supplied to low brake B2, a first selector valve 40 for opening and closing a first pressure supply passage to supply the fluid pressure to the first pressure chamber 37, and a second selector valve 41 (serving as a selector valve or changeover valve) for opening and closing a second pressure supply passage to supply the fluid pressure to the second pressure chamber 38.

The opening of pressure control valve 39 is controlled in accordance with an operation quantity of a linear solenoid 50. By the action of an on/off solenoid 51, the first selector valve 40 moves between a first valve position (or connecting position) connecting the first pressure chamber 37 with the pressure control valve 39, and a second valve position (or disconnecting position) disconnecting the first pressure chamber 37 from the pressure control valve 39. The second selector valve 41 receives, as pilot pressure, the supply pressure to input clutch C1 and the supply pressure to direct clutch C2, and moves between a first valve position (or connecting position) connecting the second pressure chamber 38 with the pressure control valve 39, and a second valve position (or disconnecting position) disconnecting the second pressure chamber 38 from the pressure control valve 39. The second selector valve 41 is shifted to the first valve position (or connecting position) when no fluid pressures are supplied to input clutch C1 and direct clutch C2. When the oil pressure is supplied to either of the input clutch C1 and direct clutch C2, the second selector valve 41 is shifted to the second valve position (disconnecting position).

The pressure control valve 39 receives the line pressure $P_L$ supplied from manual valve 32 to the hydraulic circuit section for low brake B2, and produces a low brake operating fluid pressure by regulating the line pressure $P_L$. The hydraulic circuit section for low brake B2 does not supply the low brake operating fluid pressure to either of the first and second pressure chambers 37 and 38 when the first and second selector valves 40 and 41 are at the respective second (disconnecting) valve positions. When either of the first and second selector valves 40 and 41 is at its first (connecting) valve position, then the low brake operating fluid pressure is supplied through the selector valve 40 or 41 at the first (connecting) valve position, to the corresponding one of the first and second pressure chambers 37 and 38. When the first and second selector valves 40 and 41 are both at the respective first (connecting) valve positions, then the low brake operating fluid pressure is supplied to both of the first and second pressure chambers 37 and 38.

As shown in the engagement table of FIG. 2, the low brake B2 is engaged only at first, second and third speeds. In the case of first and second speeds, the torque ratio (share torque) is great and the low brake B2 requires a greater engagement capacity between the first friction plates 33 and second friction plates 44. Therefore, the first and second selector valves 40 and 41 are both put in the respective first (connecting) valve positions. In the case of third speed, the torque ratio is smaller and the required engagement capacity is not so great. Therefore, the first selector valve 40 is controlled to the first (connecting) valve position and the second selector valve 41 is controlled to the second (disconnecting) valve position.

In the shift from third speed to second speed in this automatic transmission, for example, the second selector valve 41 is changed over from the second (disconnecting) valve position to the first (connecting) valve position. If, in this changeover, the second selector valve 41 sticks and becomes immovable because of involvement of a removed burr, and thereafter the pressure control valve 39 sticks at the valve position to supply the oil pressure, then the oil pressure is supplied invariably to the second pressure chamber 38. If, in this state, another clutch or brake is engaged, simultaneously with low brake B2, in a subsequent shift operation, the vehicle might be decelerated abruptly by interlock in the automatic transmission.

Figure 4:
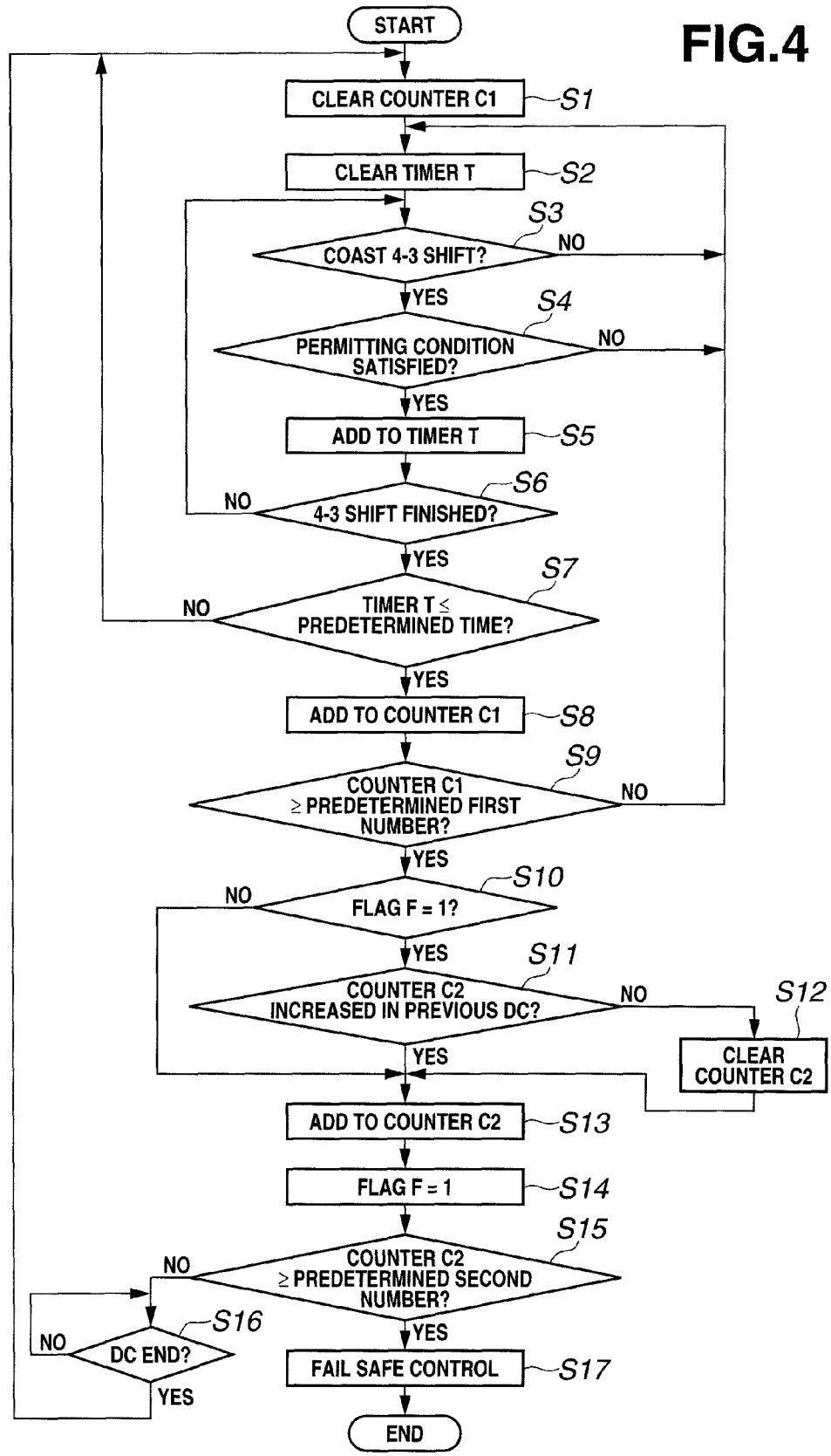
FIG. 4 is a flowchart showing a control process according to the first embodiment, performed by ATCU shown in FIG. 1.

FIG. 4 shows, in the form of a flowchart, a control process performed by ATCU 20 according to the first embodiment, to prevent such a problem.

In the control process of FIG. 4, ATCU first clears a first counter C1 at a step S1, and then clears a timer T at a step S2. Counter C1 and timer T are incremented at later steps as explained later.

At a next step S3, ATCU examines whether a coast 4-3 shift operation is in progress. From S3, ATCU proceeds to a step S4 when the coast 4-3 shift operation is in progress, and returns to S2 when the coast 4-3 shift operation is not in progress. ATCU judges that the coast 4-3 shift operation is in progress when the vehicle is a coast operation and the automatic transmission is in a shift operation from fourth speed (a first gearing state) to third speed (a second gearing state). ATCU can ascertain the coast operation by checking whether an idle switch (not shown) is ON or not. Alternatively, it is optional to ascertain the coast operation by examining whether the accelerator operation quantity sensed by APO sensor 1 is smaller than or equal to a predetermined value, or by examining whether the throttle opening is smaller than or equal to a predetermined value.

At step S4, ATCU examines whether a detection permitting condition is satisfied or not. FROM S4, ATCU proceeds to a step S5 when the detection permitting condition is satisfied, and returns to S2 when the detection permitting condition is not satisfied. The detection permitting condition is a condition which is satisfied when all the following first, second, third and fourth conditions are satisfied. The first condition is satisfied when the inhibitor switch 6 is normal. The second condition is satisfied when a drive wheel spin is not detected. The third condition is satisfied when there is no hard vehicle deceleration. The fourth condition is satisfied when the shift position of the automatic transmission is in the D range.

At step S5, ATCU increments the before-mentioned timer T (or add a predetermined number to timer T). The timer T is used to measure time (an inertia phase time) required from a start of a coast 4-3 shift operation to an end of the coast 4-3 shift operation.

At a step S6, ATCU examines whether the 4-3 shift operation is finished or not. From S6, ATCU proceeds to a step S7 when the judgment is that the 4-3 shift operation is finished, and returns to step S3 when the judgment is that the 4-3 shift operation is not yet finished. ATCU examines whether the 4-3 shift operation is finished, by examining whether the inertia phase is finished or not.

FIG. 5 (FIGS. 5A~5D) is a time chart of a 4-3 shift operation for illustrating the examination to detect an end of the 4-3 shift operation in terms of an acceleration of the output shaft (FIG. 5A), a rotational speed of the input shaft (FIG. 5B), a command pressure of the H&LR clutch (FIG. 5C), and a command pressure of the low brake (FIG. 5D).

When a 4-3 shift command is outputted at an instant t1, the command pressure of H&LR clutch C3 is decreased like a step and the command pressure of low brake B2 is increased gradually. At an instant t2, H&LR clutch C3 is disengaged completely, and low brake B2 starts engaging. Therefore, at t2, the gear ratio starts varying toward the speed ratio of the third speed from the speed ratio of the fourth speed. As a result, the input speed of input shaft 92 starts increasing, and the deceleration of output shaft 93 starts increasing. Thereafter, when low brake B2 is engaged completely at an instant t3, the deceleration of output shaft 93 becomes approximately equal to zero, and the input speed of input shaft 92 becomes approximately constant. Accordingly, at an instant t4, ATCU increases the opening of pressure control valve 39 to the maximum level, and increases the command pressure of low brake B2 like a step.

In this example, the inertia phase is a period from t2 to t3 during which the speed ratio is varying. Thus, ATCU decides that the 4-3 shift operation is finished, at the end t3 of the inertia phase.

At step S7, ATCU examines whether the timer T is shorter than or equal to a predetermined time length. From S7, ATCU proceeds to a step S8 when the timer T is equal to or shorter than the predetermined time length, and returns to S1 when the timer T is longer than the predetermined time length.

In the form of a time chart similar to FIG. 5 (FIGS. 5A~5D), FIG. 6 (FIGS. 6A~6D) shows a 4-3 shift operation in an abnormal state to clarify the meaning of the predetermined time length of step S7. FIG. 6A shows the acceleration of output shaft 93, FIG. 6B shows the rotational speed of input shaft 92, FIG. 6C shows the command pressure of H&LR clutch C3, and FIG. 6D shows the command pressure of low brake B2.

In the state in which, because of a failure in the second selector valve 41, the fluid pressure is supplied invariably to the second pressure chamber 38 of low brake B2, the second selector valve 41 is held in the first valve position without regard to the command pressure for low brake B2 in the 4-3 shift, and the second pressure chamber 38 is held in fluid communication with pressure control valve 39. Therefore, the engagement capacity for the fluid pressure actually supplied to low brake B2 becomes excessive beyond a proper value. As a result, after a start t2 of the inertia phase, the shift of low brake B2 proceeds faster, the rate of increase of the input speed of input shaft 92 is higher, the deceleration (or the rate of decrease of the rotational speed) of output shaft 93 is higher as compared to normal, and the inertia phase time becomes significantly shorter than normal. In order to detect such an inertia phase time accurately, the predetermined time length of step S7 is determined in accordance with an inertia phase time obtained when the fluid pressure for the 4-3 shift operation is supplied simultaneously to both the first and second pressure chambers 37 and 38.

At step S8, ATCU increments the first counter C1 (or add a predetermined number to first counter C1). First counter C1 is for counting the number of judgments that the timer T is equal to shorter than the predetermined time length.

At a step S9, ATCU examines whether the first counter C1 is greater than or equal to a predetermined first number or not. From S9, ATCU proceeds to a step S10 when the first counter C1 is greater than or equal to the predetermined first number, and returns to step S2 when the first counter C1 is smaller than the predetermined first number. The predetermined first number is a number so determined experimentally in advance as to represent the number of times of consecutive judgments of abnormality that the time of the coast 4-3 shift is too short, in one driving cycle, required to discriminate an actual failure securely from a temporary irregularity. The driving cycle is a period from a turn-on of an ignition key switch to a turn-off of the ignition key switch.

At step S10, ATCU examines whether a flag F is equal to one or not. From S10, ATCU proceeds to a step S11 when F=1, and proceeds to a step S13 when F=0. Flag F is a condition code to indicate the execution of at least one incrementing operation of incrementing a second counter C2.

At step S11, ATCU examines whether addition has been performed to the second counter C2 in the previous driving cycle. From S11, ATCU proceeds to a step S13 when the addition to second counter C2 has been performed in the previous driving cycle, and proceeds to a step S12 when the second counter C2 is not increased in the previous driving cycle. The second counter C2 is a counter for measuring the number of driving cycles in which the first counter C1 becomes greater than or equal to the predetermined first number.

At step S12, ATCU clears the second counter C2. At step S13, ATCU increases the second counter C2 by addition of a predetermined number. At a step S14, ATCU sets flag F to one.

At a step S15 (abnormality detecting or judging means), ATCU examines whether the second counter C2 is greater than or equal to a second predetermined number. From S15, ATCU proceeds to a step S17 when second counter C2 is greater than or equal to the second predetermined number, and proceeds to a step S16 when second counter C2 is smaller than the second predetermined number.

At step S16, ATCU examines whether the current driving cycle is finished or not. From S16, ATCU returns to step S1 when the current driving cycle is finished, and repeats step S16 when the current driving cycle is not yet finished. ATCU checks whether the key switch of the vehicle is turned off, to determine whether the current driving cycle is finished.

At step S17, ATCU performs a fail-safe control operation in response to the affirmative answer of S15 warning the detection of an abnormal condition. In this example, ATCU limits the selectable speed to the first speed, second speed and third speed after the vehicle is stopped. Thus, ATCU prevents occurrence of interlock by preventing a shifting operation requiring disengagement of low brake B2. Thus, as a control in an abnormal state, the control system of this example limits the selectable speed to the first, second and third speeds after a stop of the vehicle.

In the first embodiment shown in FIG. 4, ATCU 20 monitors the inertia phase time as a parameter in a shift from 4th speed to 3rd speed, and determines whether the second selector valve 41 is in the abnormal state or not, in accordance with the inertia phase time. Therefore, the control system can detect a failure in the second selector valve 41 accurately, and prevent abrupt deceleration of the vehicle due to an interlock in the automatic transmission, despite of a subsequent failure in the pressure control valve 39.

The control system including ATCU 20 as a main component can detect a failure in the second selector valve 41 accurately by monitoring, as the parameter in the 4-3 shift, the inertia phase time which does not change during the shift, and which does not depend on the sensitivity of the vehicle.

The control system performs the abnormality check of second selector valve 41 by using frequent 4-3 shifts during the coasting operation of the vehicle. Therefore, the control system have many opportunities for the abnormality check. Moreover, the control system can judge the abnormality in the second selector valve 41 stably and accurately by using the coasting operation in which the input torque is stable.

The fail-safe control operation is performed when the second counter C2 representing the number of consecutive abnormality judgments in consecutive driving cycles is greater than or equal to the second predetermined number. Therefore, the control system can prevent superfluous fail-safe control responsive to temporary sticking in the second selector valve 41 and thereby prevent deterioration of the driving performance. Furthermore, even in case of a failure in the second selector valve 41, the automatic transmission is still be able to achieve all the shift speeds, and a fail-safe control operation responsive to the failure of the second selector valve 41 is not necessarily urgent. Therefore, by performing the fail-safe control operation when the counter C2 becomes equal to or greater than the predetermined second number, the control system can detect a failure of the second selector valve 41 accurately, and prevent interlock or undesired simultaneous engagement of two friction engagement elements in preparation of a failure in the pressure control valve 39.

In the fail-safe control, the control system prevents shifting operations to the 4th through 7th speeds requiring engagement of one or more friction engagement element which would cause interlock if engaged simultaneously with the engagement of the low brake B2. Therefore, the control system can prevent interlock due to a failure of the pressure control valve 39 subsequent to a failure of the second selector valve 41, and thereby prevent abrupt deceleration of the vehicle.

Figure 7:
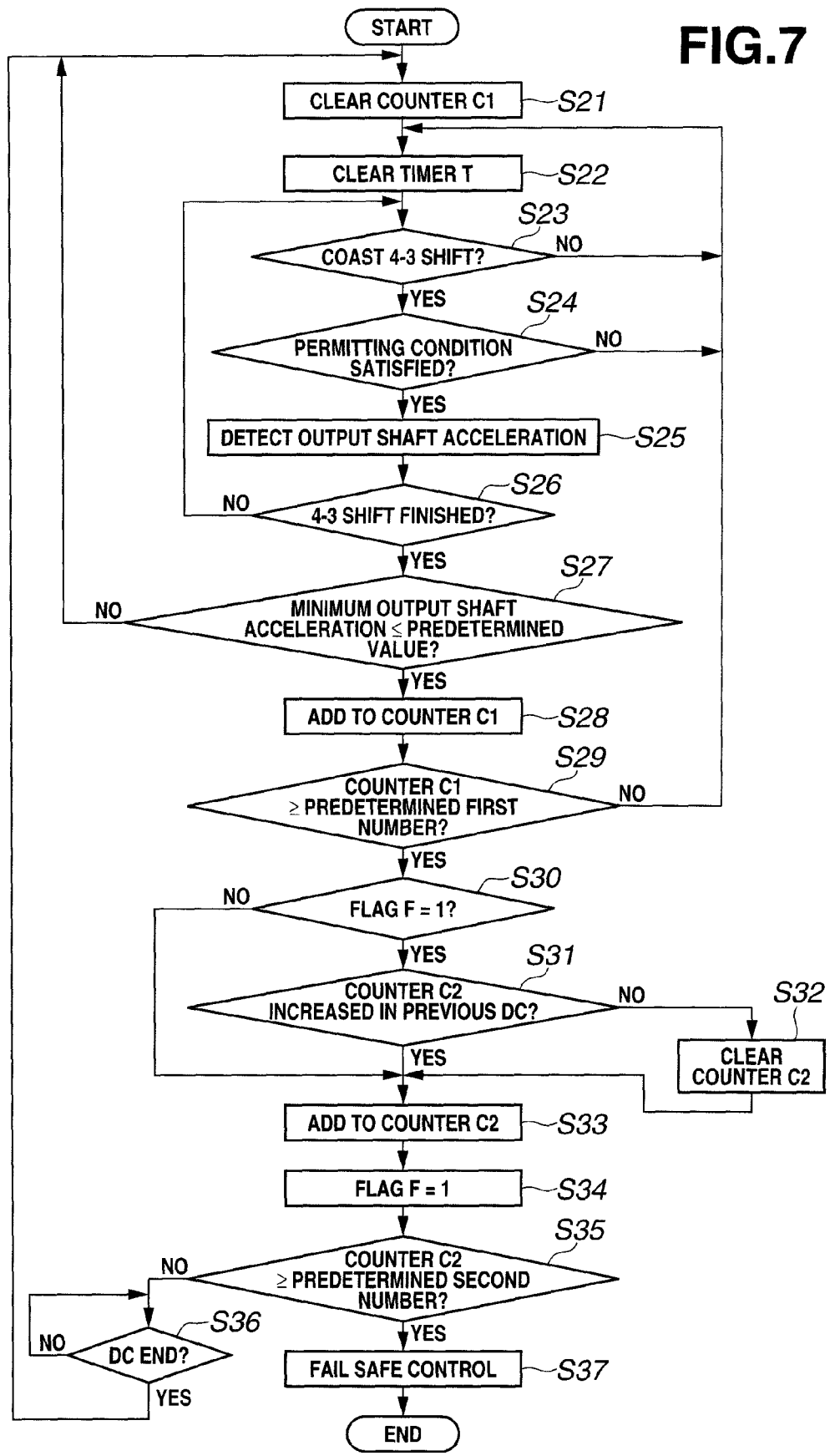
FIG. 7 is a flowchart showing a control process according to the second embodiment, performed by ATCU.

FIG. 7 shows a control process performed by ATCU 20 in an automatic transmission according to a second embodiment of the present invention. The construction of the automatic transmission according to the second embodiment is the same as that of the first embodiment as shown in FIGS. 1~3.

Steps S21~S24 are substantially identical to steps S1~S4 of FIG. 4.

At a step S25, ATCU ascertains an acceleration of output shaft 93, and stores the acceleration in a memory. A step S26 is substantially identical to step S6 of FIG. 4.

At a step S27 reached when the answer of S26 is YES, ATCU checks a minimum value among stored values of the acceleration of output shaft 93 stored at step S25, and determines whether the minimum value of the acceleration of output shaft 93 is lower than or equal to a predetermined acceleration value or not. From S27, ATCU proceeds to a step S28 when the minimum acceleration value of output shaft 93 is equal to or lower than the predetermined acceleration value, and returns to step S21 when the minimum output shaft acceleration value is higher than the predetermined acceleration value. So as to make it possible to detect an abnormality accurately, the predetermined acceleration value is determined in accordance with the acceleration of output shaft 93 obtained when the hydraulic fluid pressure is supplied simultaneously to the first and second pressure chambers 37 and 38.

Steps S28~S37 are substantially identical to steps S8~S17 of FIG. 4.

Thus, ATCU 20 according to the second embodiment utilizes the output acceleration of output shaft 93 as the parameter to determine whether a condition to increase the first counter C1 is satisfied or not, in place of the time required until an end of the coast 4-3 shift.

The acceleration (or the time rate of change of the rotational speed) of output shaft 93 becomes negative during the coast 4-3 shift as shown in FIG. 5A. In the abnormal condition in which the time for the 4-3 shift is short, the acceleration of output shaft 93 further decreases (that is, the deceleration increases) beyond normal, as shown in FIG. 6A. Therefore, the control system can ascertain the occurrence of an abnormal condition by checking whether the minimum value of the acceleration of output shaft 93 is smaller than or equal to the predetermined acceleration value.

In the second embodiment shown in FIG. 7, ATCU 20 monitors the output shaft acceleration as the parameter in the shift from 4th speed to 3rd speed, and determines whether the second selector valve 41 is in the abnormal state or not, in accordance with the output shaft acceleration. Therefore, the control system can detect a failure in the second selector valve 41 accurately, and prevent abrupt deceleration of the vehicle due to an interlock in the automatic transmission, despite of a subsequent failure in the pressure control valve.

The control system according to the second embodiment can detect a failure in the second selector valve 41 accurately, as in the first embodiment, by monitoring, as the parameter in the 4-3 shift, the output shaft acceleration (or the rate of decrease of the output rotational speed of output shaft 93).

The control system according to the second embodiment performs the abnormality check of second selector valve 41 by using the chances of frequently occurring 4-3 shifts during the coasting operation of the vehicle. Therefore, the control system can have many opportunities for the abnormality check. Moreover, the control system can judge the abnormality in second selector valve 41 stably and accurately by utilizing the coasting operation during which the input torque is stable.

The fail-safe control operation is performed when the second counter C2 representing the number of consecutive abnormality judgments in consecutive driving cycles is greater than or equal to the second predetermined number. Therefore, the control system according to the second embodiment can prevent superfluous fail-safe control operation responsive to temporary sticking in the second selector valve 41 and thereby prevent deterioration of the driving performance. Furthermore, even in case of a failure in the second selector valve 41, the automatic transmission is still be able to achieve all the speeds, and a fail-safe control operation responsive to the failure of the second selector valve 41 is not strictly urgent. Therefore, by performing the fail-safe control operation when the counter C2 becomes equal to or greater than the predetermined second number, the control system can detect a failure of the second selector valve 41 accurately, and prevent interlock or undesired simultaneous engagement of two friction engagement elements in preparation for a failure in the pressure control valve 39.

In the fail-safe control, the control system according to the second embodiment prevents shifting operations to the 4th through 7th speeds which are the speeds requiring engagement of one or more friction engagement element which would cause interlock if engaged simultaneously with the engagement of low brake B2. Therefore, the control system can prevent interlock due to a failure of the pressure control valve 39 subsequent to a failure of the second selector valve 41, and thereby prevent abrupt deceleration of the vehicle.

Figure 8:
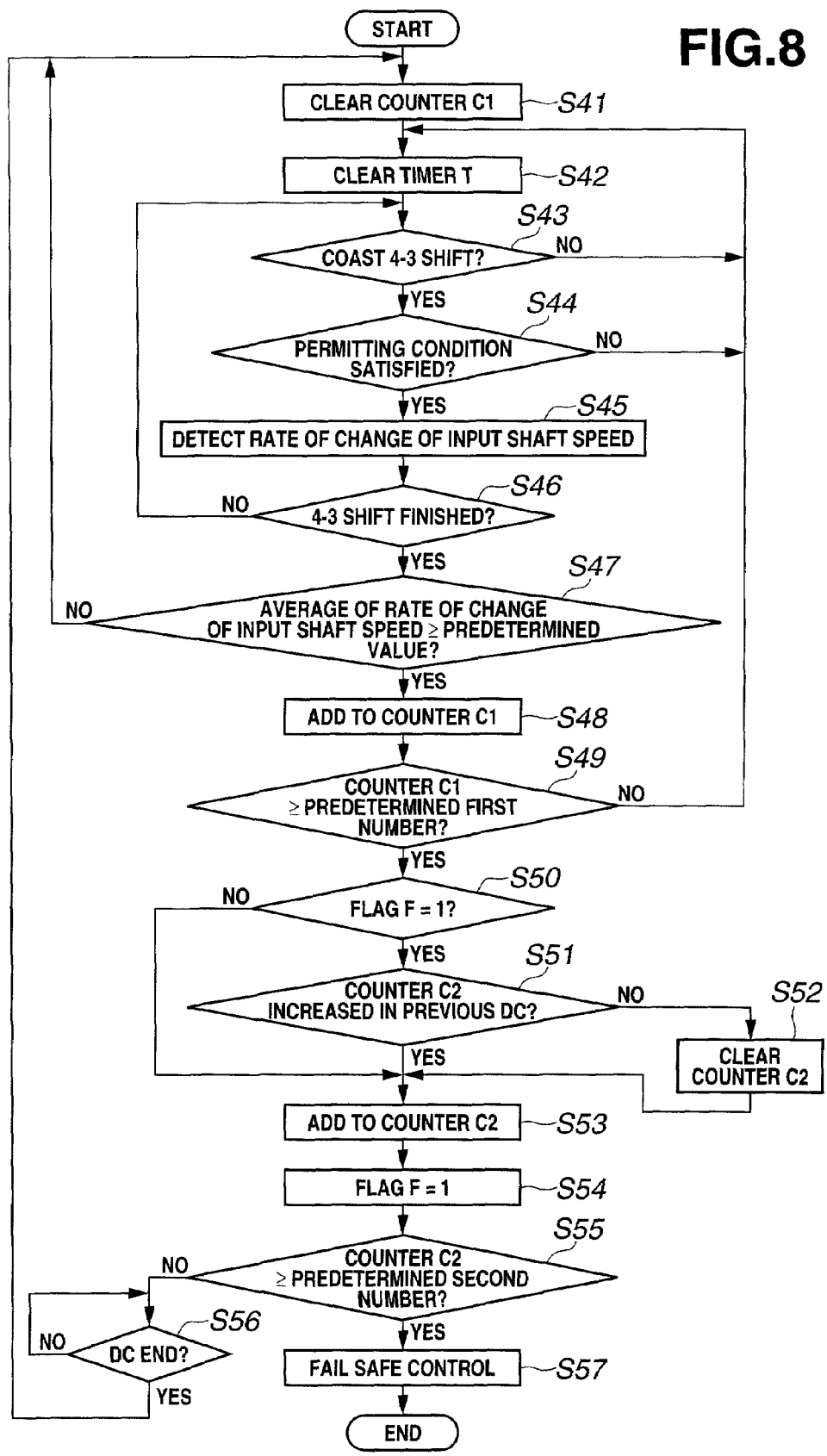
FIG. 8 is a flowchart showing a control process according to the third embodiment, performed by ATCU.

FIG. 8 shows a control process performed by ATCU 20 in an automatic transmission according to a third embodiment of the present invention. The construction of the automatic transmission according to the third embodiment is the same as that of the first embodiment as shown in FIGS. 1~3.

Steps S41~S44 are substantially identical to steps S1~S4 of FIG. 4.

At a step S45, ATCU ascertains the rate of change of the rotational speed of input shaft 92 with respect to time, and stores the rate of change of the input shaft speed in a memory. A step S46 is substantially identical to step S6 of FIG. 4.

At a step S47, ATCU checks an average of the rate of change of the input shaft speed stored at step S45 in the inertia phase, and determines whether the average of the rate of change of the input shaft speed is greater than or equal to a predetermined rate value or not. From S47, ATCU proceeds to a step S48 when the average rate of change of the input speed of input shaft 92 is equal to or higher than the predetermined rate value, and returns to step S41 when the average rate of change of the input speed is lower than the predetermined rate value. So as to make it possible to detect an abnormality accurately, the predetermined rate value is determined in accordance with the average rate of change of input speed of input shaft 92 obtained when the fluid pressure is supplied simultaneously to the first and second pressure chambers 37 and 38.

Steps S48~S57 are substantially identical to steps S8~S17 of FIG. 4.

Thus, ATCU 20 according to the third embodiment utilizes the average of the rate of change of the rotational speed of input shaft 92 in the inertia phase, as the parameter to determine whether the condition to increase the first counter C1 is satisfied or not, in place of the time required to accomplish the coast 4-3 shift.

The time rate of change of the rotational speed of input shaft 92 during the coast 4-3 shift becomes greater in the abnormal state as shown in FIG. 6B where the time for the 4-3 shift is short, than in the normal state shown in FIG. 5B. Therefore, the control system can ascertain the occurrence of an abnormal condition by comparing the average of the rate of change of the input speed of input shaft 92 in the inertia phase of the 4-3 shift with the predetermined rate value.

In place of the average of the rate of change of the input speed of input shaft 92, it is optional to employ a maximum value of the rate of change of the input speed of input shaft 92.

In the third embodiment shown in FIG. 8, ATCU 20 monitors the rate of change (or the rate of increase) of the input shaft speed as the parameter in the shift from 4th speed to 3rd speed, and determines whether the second selector valve 41 is in the abnormal state or not, in accordance with the rate of change of the input shaft speed. Therefore, the control system can detect a failure in the second selector valve 41 accurately, and prevent abrupt deceleration of the vehicle due to an interlock in the automatic transmission, despite of a subsequent failure in the pressure control valve.

The control system according to the third embodiment can detect a failure in the second selector valve 41 accurately, as in the first embodiment, by monitoring, as the parameter in the 4-3 shift, the variation or behavior of the input shaft speed such as the rate of change of the input shaft speed.

The control system according to the third embodiment performs the abnormality check of the second selector valve 41 by using the chances of frequently occurring 4-3 shifts during the coasting operation of the vehicle. Therefore, the control system can have many opportunities for the abnormality check. Moreover, the control system can judge the abnormality in the second selector valve 41 stably and accurately by utilizing the coasting operation during which the input torque is stable.

The fail-safe control operation is performed when the second counter C2 representing the number of consecutive abnormality judgments in consecutive driving cycles is greater than or equal to the second predetermined number. Therefore, the control system according to the third embodiment can prevent superfluous fail-safe control responsive to temporary sticking in the second selector valve 41 and thereby prevent deterioration of the driving performance. Furthermore, even in case of a failure in the second selector valve 41, the automatic transmission is still be able to achieve all the shift speeds, and a fail-safe control operation responsive to the failure of the second selector valve 41 is not necessarily urgent. Therefore, by performing the fail-safe control operation when the counter C2 becomes equal to or greater than the predetermined second number, the control system can detect a failure of the second selector valve 41 accurately, and prevent interlock or undesired simultaneous engagement of two friction engagement elements in preparation for a failure in the pressure control valve 39.

In the fail-safe control, the control system according to the third embodiment prevents shifting operations to the 4th through 7th speeds requiring engagement of one or more friction engagement element which would cause interlock if engaged simultaneously with the engagement of the low brake B2. Therefore, the control system can prevent interlock due to a failure of the pressure control valve 39 subsequent to a failure of the second selector valve 41, and thereby prevent abrupt deceleration of the vehicle.

FIG. 9 shows a control process performed by ATCU 20 in an automatic transmission according to a fourth embodiment of the present invention. The construction of the automatic transmission according to the fourth embodiment is the same as that of the first embodiment as shown in FIGS. 1~3.

Steps S61~S64 are substantially identical to steps S1~S4 of FIG. 4.

At a step S65, ATCU ascertains a rate of change of the gear ratio, and stores the rate of change of the gear ratio. A step S66 is substantially identical to step S6 of FIG. 4.

At a step S67, ATCU checks the rate of change of the gear ratio stored at step S65, and determines whether the rate of change of the gear ratio is greater than or equal to a predetermined gear ratio rate value or not. From S67, ATCU proceeds to a step S68 when the rate of change of the gear ratio is equal to or higher than the predetermined gear ratio rate value, and returns to step S61 when the rate of the gear ratio is lower than the predetermined gear ratio rate value. So as to make it possible to detect an abnormality accurately, the predetermined gear ratio rate value is determined in accordance with the rate of change of the gear ratio obtained when the oil pressure is supplied simultaneously to the first and second pressure chambers 37 and 38.

Steps S68~S77 are substantially identical to steps S8~S17 of FIG. 4.

Thus, ATCU 20 according to the fourth embodiment utilizes the rate of change of the gear ratio, as the parameter to determine whether the condition to increase the first counter C1 is satisfied or not, in place of the time required to accomplish the coast 4-3 shift.

The rate of change of the gear ratio during the coast 4-3 shift becomes greater in the abnormal state where the time for the 4-3 shift is short, than in the normal state. Therefore, the control system can ascertain the occurrence of an abnormal condition by comparing the rate of change of the gear ratio with the predetermined gear ratio rate value.

In the fourth embodiment shown in FIG. 9, ATCU 20 monitors the rate of change of the gear ratio as the parameter in the shift from 4th speed to 3rd speed, and determines whether the second selector valve 41 is in the abnormal state or not, in accordance with the rate of change of the gear ratio. Therefore, the control system can detect a failure in the second selector valve 41 accurately, and prevent abrupt deceleration of the vehicle due to an interlock in the automatic transmission, despite of a subsequent failure in the pressure control valve.

The control system according to the fourth embodiment can detect a failure in the second selector valve 41 accurately, as in the first embodiment, by monitoring, as the parameter in the 4-3 shift, the variation of the gear ratio such as the rate of change of the gear ratio.

The control system according to the fourth embodiment performs the abnormality check of the second selector valve 41 by using the chances of frequently occurring 4-3 shifts during the coasting operation of the vehicle. Therefore, the control system can have many opportunities for the abnormality check. Moreover, the control system can judge the abnormality in the second selector valve 41 stably and accurately by utilizing the coasting operation during which the input torque is stable.

The fail-safe control operation is performed when the second counter C2 representing the number of consecutive abnormality judgments in consecutive driving cycles is greater than or equal to the second predetermined number. Therefore, the control system according to the fourth embodiment can prevent superfluous fail-safe control responsive to temporary sticking in the second selector valve 41 and thereby prevent deterioration of the driving performance. Furthermore, even in case of a failure in the second selector valve 41, the automatic transmission is still be able to achieve all the shift speeds, and a fail-safe control operation responsive to the failure of the second selector valve 41 is not necessarily urgent. Therefore, by performing the fail-safe control operation when the counter C2 becomes equal to or greater than the predetermined second number, the control system can detect a failure of the second selector valve 41 accurately, and prevent interlock or undesired simultaneous engagement of two friction engagement elements in preparation for a failure in the pressure control valve 39.

In the fail-safe control, the control system according to the fourth embodiment prevents shifting operations to the 4th through 7th speeds requiring engagement of one or more friction engagement element which would cause interlock if engaged simultaneously with the engagement of the low brake B2. Therefore, the control system can prevent interlock due to a failure of the pressure control valve 39 subsequent to a failure of the second selector valve 41, and thereby prevent abrupt deceleration of the vehicle.

In the example of FIG. 1, the speed sensors 3 and 4 can serve as an input speed sensor for sensing the rotational speed of input shaft 92. The rotational speed (N(R2)) of input shaft 92 (and second ring gear R2) can be calculated from the rotational speed (N(PC1)) of first planet carrier PC1 sensed by first speed sensor 3, and the rotational speed (N(PC2)) of second planet carrier PC2 sensed by second speed sensor 4 according to the following equation.

$$N(R2)=(1+\beta 2/\beta 1)N(PC2)-(\beta 2/\beta 1)N(PC1)$$

where $\beta 1$ is a ratio $(Zs1/Z_R1)$ of the number (Zs1) of teeth of first sun gear S1 to the number ($Z_R1$) of teeth of first ring gear R1, and $\beta 2$ is a ratio $(Zs2/Z_R2)$ of the number (Zs2) of teeth of second sun gear S2 to the number ($Z_R2$) of teeth of second ring gear R2. Although the input speed is calculated in this way from the signals from the first and second speed sensors 3 and 4 in the example of FIG. 1, it is possible to sense the rotational speed of input shaft 92 with an input shaft speed sensor arranged to sense the rotational speed of input shaft 92 directly. Thus, the system according to the third embodiment shown in FIG. 8 can ascertain the actual rotational speed of input shaft 92 by using the output signals from the sensors 3 and 4, or by using the output signal from the input shaft speed sensor directly sensing the rotation of input shaft 92, and calculates the rate of change of the input shaft speed with respect to time, from the actual rotational speed of input shaft 92, at step S45.

According to the fourth embodiment, the system can determine the actual gear ratio from the actual input shaft speed determined by using the sensors 3 and 4 or the above-mentioned input shaft speed sensor, and the actual output shaft speed sensed by the output shaft speed sensor 5. Thus, the system determines the actual gear ratio (the actual input shaft speed/the actual output shaft speed) from the actual input and output shaft speeds, and calculate the rate of change of the actual gear ratio at step S65.

In the example of FIG. 4 according to the first embodiment, the system determines the inertia phase time (T) by monitoring variation of the actual gear ratio (the actual input shaft speed/the actual output shaft speed). More specifically, the system judges that the shift (the inertia phase) from the before-shift gear position (fourth speed) to the after-shift gear position (third speed) is started when the actual gear ratio is varied by a predetermined amount from the gear ratio of the before-shift gear position (fourth speed); and the system judges that the shift (the inertia phase) from the before-shift gear position (fourth speed) to the after-shift gear position (third speed) is finished when the actual gear ratio enters a predetermined range near the gear ratio of the after-shift gear position (third speed). Thus, ATCU 20 can start the measurement of the inertia phase time (T) (at step S3) when the actual gear ratio is varied from the gear ratio of the before-shift gear position (fourth speed) toward the gear ratio of the after-shift gear position (third speed) and the difference between the actual gear ratio and the gear ratio of the before-shift gear position becomes greater than the predetermined amount (in the coasting operation); an ends the measurement of the inertial phase time (T) (at step S6) when the actual gear ratio approaches the gear ratio of the after-shift gear position (third speed), and the difference between the actual gear ratio and the gear ratio of the after-shift gear position becomes smaller than a predetermined value. However, the measurement of the inertia phase time is not limited to this method based on the actual gear ratio. For example, it is possible to detect the start and end of an inertia phase by monitoring variation of the input shaft speed (as shown in FIG. 5B).

According to the illustrated embodiments, an automatic transmission includes at least: a planetary gear mechanism; an engagement element group (or device group) including a plurality of friction engagement elements (or devices) to achieve a plurality of gear ratios in the planetary gear mechanism, at least one of the friction engagement elements being a first (or variable) engagement element including a first pressure chamber and a second pressure chamber; a pressure control valve to produce a hydraulic fluid pressure to be supplied to the particular engagement element; and a selector valve arranged to connect the second pressure chamber of the particular engagement element with the pressure control valve when the selector valve is at a first valve position, and to disconnect the second pressure chamber from the pressure control valve when the selector valve is at a second valve position. For this automatic transmission, a controlling or abnormality detecting apparatus (such as ATCU 20) includes at least a shifting means for commanding a shift operation from a first gear ratio, to a second gear ratio, by producing a command signal to control the selector valve to the second valve position to disconnect the second pressure chamber from the pressure control valve and to engage the particular engagement element by supplying the hydraulic fluid pressure from the pressure control valve to the first pressure chamber of the particular engagement element; and monitoring means for monitoring behavior of engagement of the particular engagement element responsive to the command signal, and for determining whether the selector valve is in an abnormal state or not, in accordance with the behavior of the engagement of the particular engagement element. At least one of steps S5, S7, S25, S27, S45, S47, S65 and S67 may correspond to at least part of the monitoring means. For the automatic transmission, a process (such as a control or abnormality detecting process performed by ATCU 20) includes at least a step of commanding a shift operation from a first gear ratio, to a second gear ratio, by producing a command signal to control the selector valve to the second valve position to disconnect the second pressure chamber from the pressure control valve and to engage the particular engagement element by supplying the hydraulic fluid pressure from the pressure control valve to the first pressure chamber of the particular engagement element; a step of monitoring behavior of engagement of the particular engagement element responsive to the command signal, and a step of determining whether the selector valve is in an abnormal state or not, in accordance with the behavior of the engagement of the particular engagement element. The process may further includes a step of performing a fail-safe control operation (corresponding to S17, S37, S57 and S77) when the selector valve is judged to be in the abnormal state.

This application is based on a prior Japanese Patent Application No. 2007-001500 filed on Jan. 9, 2007 in Japan. The entire contents of this Japanese Patent Application No. 2007-001500 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
 a planetary gear mechanism;
 an engagement element group including a plurality of friction engagement elements to achieve a plurality of gear positions in the planetary gear mechanism, at least one of the friction engagement elements being a particular engagement element including first and second pressure chambers to which a hydraulic fluid pressure is to be supplied to actuate the friction engagement element;
 a pressure control valve to regulate the hydraulic fluid pressure to be supplied to the particular engagement element;
 a selector valve arranged to connect the second pressure chamber of the particular engagement element with the pressure control valve when the selector valve is at a first valve position, and to disconnect the second pressure chamber from the pressure control valve when the selector valve is at a second valve position; and
 a shift control section configured,
 to command a shift operation from a first gear position in which the particular engagement element is disengaged, to a second gear position in which the particular engagement element is engaged, by controlling the selector valve to the second valve position to disconnect the second pressure chamber from the pressure control valve and by supplying the hydraulic fluid pressure from the pressure control valve to the first pressure chamber of the particular engagement element, and
 to judge the selector valve to be in an abnormal state in which the selector valve is unable to disconnect the second pressure chamber from the pressure control valve, in accordance with a parameter in the shift operation from the first gear position to the second gear position.

2. The automatic transmission as claimed in claim 1, wherein the shift control section is configured to detect the abnormal state of the selector valve in accordance with the parameter which is an inertia phase time in the shift operation from the first gear position to the second gear position.

3. The automatic transmission as claimed in claim 1, wherein the shift control section is configured to detect the abnormal state of the selector valve in accordance with the parameter which is an acceleration of an output shaft of the automatic transmission in the shift operation from the first gear position to the second gear position.

4. The automatic transmission as claimed in claim 1, wherein the shift control section is configured to detect the abnormal state of the selector valve in accordance with the parameter which is a rate of change of a rotational speed of an input shaft of the automatic transmission in the shift operation from the first gear position to the second gear position.

5. The automatic transmission as claimed in claim 1, wherein the shift control section is configured to detect the abnormal state in accordance with the parameter which is a rate of change of a gear ratio of the automatic transmission in the shift operation from the first gear position to the second gear position.

6. The automatic transmission as claimed in claim 1, wherein the shift control section is configured to detect the abnormal state of the selector valve in accordance with the parameter in the shift operation from the first gear position to the second gear position in a coasting state of a vehicle.

7. The automatic transmission as claimed in claim 1, wherein the shift control section is configured to impose limitation on the shift of the automatic transmission when a number of consecutive driving cycles in which the selector valve is judged to be in the abnormal state.

8. The automatic transmission as claimed in claim 1, wherein, when the selector valve is judged to be in the abnormal state, the shift control section prevents a shift to a gear position in which a second engagement element which is another one of the friction engagement elements is engaged, and simultaneous engagement of the second engagement element with the particular engagement element causes an interlock.

9. An automatic transmission comprising:
 a planetary gear mechanism;
 an engagement element group including a plurality of friction engagement elements to achieve a plurality of gear ratios in the planetary gear mechanism, at least one of the friction engagement elements being a particular engagement element including a first hydraulic pressure chamber and a second hydraulic pressure chamber;
 a hydraulic circuit including a pressure control valve to produce a hydraulic fluid pressure to be supplied to at least one of the first and second pressure chambers of the particular engagement element, and a selector valve including a first valve position to connect the second pressure chamber of the particular engagement element with the pressure control valve, and a second valve position to disconnect the second pressure chamber from the pressure control valve; and
 a shift control section configured,
 to command a shift operation from a first gear ratio to a second gear ratio by producing a command signal to control the selector valve to the second valve position to disconnect the second pressure chamber from the pressure control valve and to supply the hydraulic fluid pressure from the pressure control valve to the first pressure chamber to engage the particular engagement element, and
 to determine whether the selector valve is in an abnormal state or not, by monitoring a parameter representing speed of engagement of the particular engagement element in the shift operation from the first gear ratio to the second gear ratio.

10. The automatic transmission as claimed in claim 9, wherein the shift control section is configured to monitor the parameter which represents speed of an inertia phase during which the gear ratio of the automatic transmission is varied from the first gear ratio to the second gear ratio by engagement of the particular engagement element.

11. The automatic transmission as claimed in claim 10, wherein the shift control section is configured to monitor the parameter which represents at least one of a time from a start to an end of the inertia phase, a variation of an input speed of the planetary gear mechanism, a variation of an output speed of the automatic transmission, and a variation of a gear ratio of the planetary gear mechanism.

12. The automatic transmission as claimed in claim 9, wherein the shift control section is configured to determine the parameter from at least one of an input speed and an output speed of the planetary gear mechanism.

13. The automatic transmission as claimed in claim 9, wherein the shift control section is configured to produce an abnormality signal when the parameter is in a condition representing excessively fast engagement of the particular engagement element.

14. The automatic transmission as claimed in claim 9, wherein the shift operation from the first gear ratio to the second gear ratio is a downshift operation.

15. The automatic transmission as claimed in claim 9, wherein the second pressure chamber is a larger pressure chamber having a pressure receiving area larger than a pressure receiving area of the first pressure chamber.

16. The automatic transmission as claimed in claim 9, wherein the particular engagement element includes a friction plate pack, a piston including a first piston portion, a second piston portion, and a third piston portion for pushing the friction plate pack, and a casing defining the first pressure chamber for applying a fluid pressure onto the first piston portion, and the second pressure chamber for applying a fluid pressure to the second piston portion.

17. The automatic transmission as claimed in claim 9, wherein, in addition to the pressure control valve, and the selector valve which is a second selector valve, the hydraulic circuit further includes a first selector valve including a first valve position to connect the first pressure chamber of the particular engagement element with the pressure control valve, and a second valve position to disconnect the first pressure chamber from the pressure control valve.

18. The automatic transmission as claimed in claim 9, wherein the shift control section is configured to perform a fail-safe operation to inhibit shift of the automatic transmission to a predetermined gear position when the selector valve is judged to be in the abnormal state.

19. An automatic transmission comprising:
a planetary gear mechanism;
an engagement element group including a plurality of friction engagement elements to achieve a plurality of gear ratios in the planetary gear mechanism, at least one of the friction engagement elements being a particular engagement element including a first pressure chamber and a second pressure chamber;
a pressure control valve to produce a hydraulic fluid pressure to be supplied to the particular engagement element;
a selector valve arranged to connect the second pressure chamber of the particular engagement element with the pressure control valve when the selector valve is at a first valve position, and to disconnect the second pressure chamber from the pressure control valve when the selector valve is at a second valve position;
shifting means for commanding a shift operation from a first gear ratio at which the particular engagement element is disengaged, to a second gear ratio at which the particular engagement element is engaged, by producing a command signal to control the selector valve to the second valve position to disconnect the second pressure chamber from the pressure control valve and to engage the particular engagement element by supplying the hydraulic fluid pressure from the pressure control valve to the first pressure chamber of the particular engagement element; and
monitoring means for monitoring behavior of engagement of the particular engagement element responsive to the command signal, and for determining whether the selector valve is in an abnormal state or not, in accordance with the behavior of the engagement of the particular engagement element.

* * * * *